2,895,836
METHOD FOR PREPARING UNSULPHURED DEHYDRATED FRUITS

Melvin E. Lazar, Oakland, and Myron J. Powers, Lafayette, Calif., assignors to the United States of America as represented by the Secretary of Agriculture No Drawing. Application January 10, 1957
Serial No. 633,508

2 Claims. (Cl. 99—204)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preparing dehydrated fruits. In particular, the invention is concerned with processes for preparing dehydrated fruits without the addition of sulphur dioxide or other sulphiting agent and which processes, despite the omission of these conventional preservative agents, yield products which exhibit essentially the natural color and flavor of the original produce and retain these desirable attributes even after long periods of storage. Further objects and advantages of the invention will be evident from the following description.

Customary commercial techniques for preparing dehydrated fruits such as apples, pears, peaches, etc. invariably involve a treatment of the fruit with sulphur dioxide or other sulphiting agent. This is done to preserve the color of the fruit by inhibiting the enzymes naturally present in the fruit tissue. Although this technique is widely used, it has the disadvantage that the sulphite absorbed in the fruit tissue impairs the flavor of the product and renders it unfit for many purposes, for example, preparation of canned baby foods.

It is of course well known in the field of food technology that enzymes can be inactivated by application of heat to plant tissue. Such processes are commonly known as blanching or scalding and involve contacting the produce with hot water or steam. It might be supposed that the above disadvantages could be avoided by eliminating the treatment with sulphur dioxide or other sulphiting agent and simply blanching the fruit and then subjecting the blanched fruit to dehydration. However, if such a procedure is attempted the results are completely unsatisfactory. Thus when the fruit having its natural moisture content is subjected to blanching, drastic changes occur in the texture of the fruit tissue. The tissue tends to soften and collapse and in the case of apples and pears, which contain considerable air in the intercellular spaces, this air is driven out. In any event, the blanched fruit cannot be dehydrated satisfactorily. If dehydration is attempted, it is found that the fruit pieces stick tenaciously to one another and to the tray or other equipment on which the drying is to take place. The fruit pieces cohere to form a mass which resist penetration of air with the result that only the outside layer dries, the center of the mass remains moist. If dehydration is finally accomplished it is found that the product has a dense and impervious structure so that it can be reconstituted only with great difficulty.

It has now been found that dehydrated fruits of high quality can be prepared without the use of a sulphiting agent but with the use of a blanching treatment applied at a particular stage in the procedure. Briefly described, the process of the invention involves the following distinct steps:

(a) The fruit is initially dehydrated to a limited extent.

(b) The partially dehydrated fruit is then subjected to blanching to inactivate the enzymes therein.

(c) The partially dehydrated, blanched fruit is then further dehydrated to such an extent that it will be self-preserving.

No sulphur dioxide or other sulphiting agent is applied to the fruit at any stage in its processing.

A key feature of the process of this invention lies in applying the blanching treatment to the fruit in a partially dehydrated condition. In this condition, the blanching does not cause the bad effects encountered when fruit in its natural moisture condition is subjected to blanching. Thus when the partially dehydrated fruit is subjected to blanching, it does not collapse but retains the same volume as before blanching. Moreover, the blanched, partially dehydrated fruit pieces exhibit a greatly reduced tendency to stick to one another or to the equipment used in the subsequent dehydration. A mass of the blanched, partially dehydrated fruit pieces remain in an open condition so that when they are subjected to dehydration the drying air can readily circulate through the mass whereby there is produced a uniformly dried product. Moreover, the dehydrated products have a porous texture and therefore can be readily reconstituted since they absorb moisture readily.

In proceeding in accordance with the invention, fresh fruit is subjected to the usual preliminary preparative steps such as washing, peeling, trimming, removal of seeds or cores, and cutting into convenient pieces such as slabs, slices, dice, etc. In many cases it is preferred to cut the fruit into pieces, one dimension of which has a thickness on the order of ½ to ¾ inch. For example, in operating on apples, the fruit is washed, peeled, cored, trimmed, and cut into wedges, say, eighths to sixteenths. The particular preliminary treatment will, in any case, depend on the type of foodstuff being handled. In the case of apricots, for example, the peeling step may be eliminated and the unpeeled fruit merely halved or cut into pieces. The invention is applicable to fruits in general, some examples being apples, peaches, pears, nectarines, apricots, pineapple, etc.

To prevent discoloration (browning) of the surface of the fruit during the partial dehydration step, the fruit prior to dehydration is treated with an enzyme-inhibiting agent other than a sulphiting agent. A preferred technique is to dip the fruit in an aqueous solution of citric acid and salt (sodium chloride). Usually a solution is used containing about 1% of each of these ingredients. However, these proportions are not critical and may be higher or lower depending on such factors as the kind of fruit, maturity of the fruit, the size of the fruit pieces, the degree of dehydration to be applied, etc. In any particular case, pilot trials with different concentrations of citric acid and salt may be conducted to select the concentrations which yield the desired result of maintaining the natural color of the fruit during the partial dehydration step. In many instances, the concentrations of citric acid and salt may each vary from about 0.5% to about 2%. Usually the fruit is dipped in the solution for a short period of time of about a minute but the fruit may be left in the solution longer without injury to hold it until ready for the partial dehydration. Holding it in the solution will prevent browning in this interim holding period. It is not essential to use citric acd and one may substtute other fruit acids such as tartaric, malic, and the like. If desired, the dipping solution may be a solution containing on the order of 0.1 to 1% ascorbic acid. Ascorbic acid may be used alone or in conjunction with a fruit acid and salt. Although a dipping treatment is generally preferred, it is obvious that the preservative solution may be applied to the fruit by other application techniques such as spraying.

After treatment with the preservative solution, the fruit pieces are subjected to partial dehydration. This is preferably conducted in the usual types of apparatus which provide a draft of heated air about the fruit pieces to cause rapid evaporation of moisture. Thus forced-air dehydrators of the tunnel, tray, continuous belt, or rotary kiln type may be employed. The temperature of the air should be about 130 to 180° F. To prevent browning of the fruit during this partial dehydration, it is preferred to conduct the dehydration as rapidly as possible. Such conditions as using through-flow air, high air velocity, high air temperature, and small piece size favor rapid evaporation of moisture. It is also desirable to avoid undue increase in piece temperature (temperature of the fruit itself) during this step to avoid internal browning. The piece temperature which can be tolerated depends on several factors including the variety of fruit, maturity, time at which the piece is maintained at this temperature, etc. In the treatment of apples, for example, it is preferred to keep the piece temperature below 110–135° F. by suitable adjustment of the air temperature. The dehydration is continued until the fruit has lost at least 50% of its weight by elimination of moisture which means that more than half of the moisture content of the fresh fruit material is removed. Although it is preferred to conduct the partial dehydration to the extent that a 50% weight reduction is obtained, a greater weight reduction is permissible and sometimes desirable, up to about 75%, with some products. In any case the moisture content of the partially dehydrated products will vary depending on the original moisture content thereof. In most cases, the partially dehydrated product will have a moisture content from about 30 to 70%. The moisture level within this range to be employed in any particular case will depend upon the nature of the fruit in question.

The partially dehydrated fruit is then subjected to blanching. This is preferably accomplished by exposing the fruit to a hot medium such as steam or a steam-air mixture. The use of such gaseous blanching media is preferred as the temperature of the fruit can be raised at a very rapid rate and the leaching of soluble constituents from the fruit is minimized. The temperature of the blanching medium is generally about 175–212° F. Temperatures below the boiling point are frequently used to avoid reduction in the volume of the fruit pieces. Such temperatures are conveniently attained by employing as the blanching medium a mixture of steam and air. As in conventional practice, the blanching is continued until the enzyme content of the fruit is completely inactivated. This point may be readily determined by known tests for the presence of enzymes such as catalase, peroxidase, etc. The time required for enzyme inactivation will vary depending on such factors as fruit piece size, temperature of the blanching medium, quantity of enzymes in the fruit tissue, and so forth. In any particular case the completion of blanching can be determined by conducting tests for presence of active enzymes as noted above and continuing the blanching until the enzymes are essentially destroyed. It is necessary to apply the blanching treatment to the fruit as soon as possible after it has been partially dehydrated to prevent browning. Also, the fruit is still warm when contacted with steam whereby condensation of steam (with attendant re-moistening of the fruit and leaching of soluble ingredients) is minimized.

After the fruit pieces have been subjected to the blanching treatment, they are dehydrated to the extent of forming a self-preserving product. Usually the moisture content of the fruit is reduced to below 10%. This final dehydration may be accomplished as set forth above in connection with the explanation of the partial dehydration step. However, since the enzymes in the fruit are inactivated, the conditions of dehydration may be selected to obtain faster evaporation of moisture than with the partial dehydration. Usually it is preferred to conduct the dehydration in two or more stages, employing decreasing temperature in the successive stages. This is done to prevent undesired increase in piece temperature which may harm the flavor and color of the fruit. Thus as the dehydration progresses the rate of evaporation necessarily decreases with the result that piece temperature progressively increases. By decreasing the temperature of the hot air an undesirable increase in piece temperature is prevented. A convenient plan, for example, involves initially employing air at a temperature as high as about 200° F., then decreasing the temperature of the air until at the final stages its temperature is about from 125 to 150° F. In general it is preferred that the drying air temperature be so regulated that the piece temperature (that is, the temperature of the fruit itself) does not rise above about from 125–150° F.

The use of dehydration under vacuum is included within the ambit of the invention and the dehydration after blanching may be so conducted. Vacuum dehydration has the obvious benefit that the removal of moisture may be conducted at lower temperatures and final products of especially low moisture content may be produced. A preferred technique in this area is to conduct the dehydration under vacuum in the temperature range about from 80 to 150° F. By conducting the vacuum dehydration with application of heat at such temperature range, the fruit pieces tend to maintain their original volume or even expand during dehydration whereby they retain a porous structure.

The invention is further demonstrated by the following illustrative example:

*Example*

A quantity of Washington State Winesap apples were washed, peeled, cored, and cut into dice ½" x ½" x ½". The apple dice were immersed for 2 minutes in an aqueous solution of 1% citric acid and 1% sodium chloride. The dice were removed from the solution, drained for a few minutes and spread on wire mesh trays with a loading of 6 lbs./sq.ft. giving a depth of about 2½ inches. The trays were placed in a dehydrator where they were subjected to a through-flow current of air at 160° F. for 40 minutes. For the first 20 minutes the air was directed upwardly, for the second 20 minutes downwardly. By this treatment, the dice were dehydrated to the extent that the weight reduction due to loss of moisture was 63%, actual moisture content of the partially dehydrated dice was approximately 40%.

The partially dehydrated apple dice were then subjected to live steam at 212° F. for 1 minute to inactivate the enzymes in the apple tissue.

The blanched dice were then dehydrated in a current of air at 160° F. for 1 hour and at 150° F. for 3 hours. The dehydrated apple dice containing 5 to 6% moisture were noted to have a uniform cream color and were completely free of greying, browning or other discoloration. It was also observed that the products had a porous texture so that they would readily absorb water. Products prepared by this technique were stored for 4 months at room temperature and found to suffer no change in color. Pies made from the stored products were comparable in taste to pies made from fresh apples.

Having thus described the invention, what is claimed is:

1. A process of preparing dehydrated fruit without addition of any sulphiting agent which comprises dipping raw fruit of natural moisture content, the fruit being in the form of pieces with cut surfaces, into an aqueous solution containing only water, sodium chloride, and citric acid, subjecting the fruit to rapid dehydration in a current of hot air at a piece temperature below 110–135° F. until its moisture content is about from 30 to 70%, blanching the partially dehydrated fruit to inactivate the enzymes therein, and dehydrating the blanched fruit until its moisture content is less than about 10%.

2. The process of claim 1 wherein the fruit is pieces of apple.

References Cited in the file of this patent

UNITED STATES PATENTS

| | | |
|---|---|---|
| 1,374,160 | Fowler | Apr. 5, 1921 |
| 2,565,942 | Barsky et al. | Aug. 28, 1951 |
| 2,676,889 | Keenan | Apr. 27, 1954 |
| 2,718,470 | Kaufman et al. | Sept. 20, 1955 |
| 2,752,253 | Talburt et al. | June 26, 1956 |
| 2,768,900 | Vertner | Oct. 30, 1956 |